Figure 1:
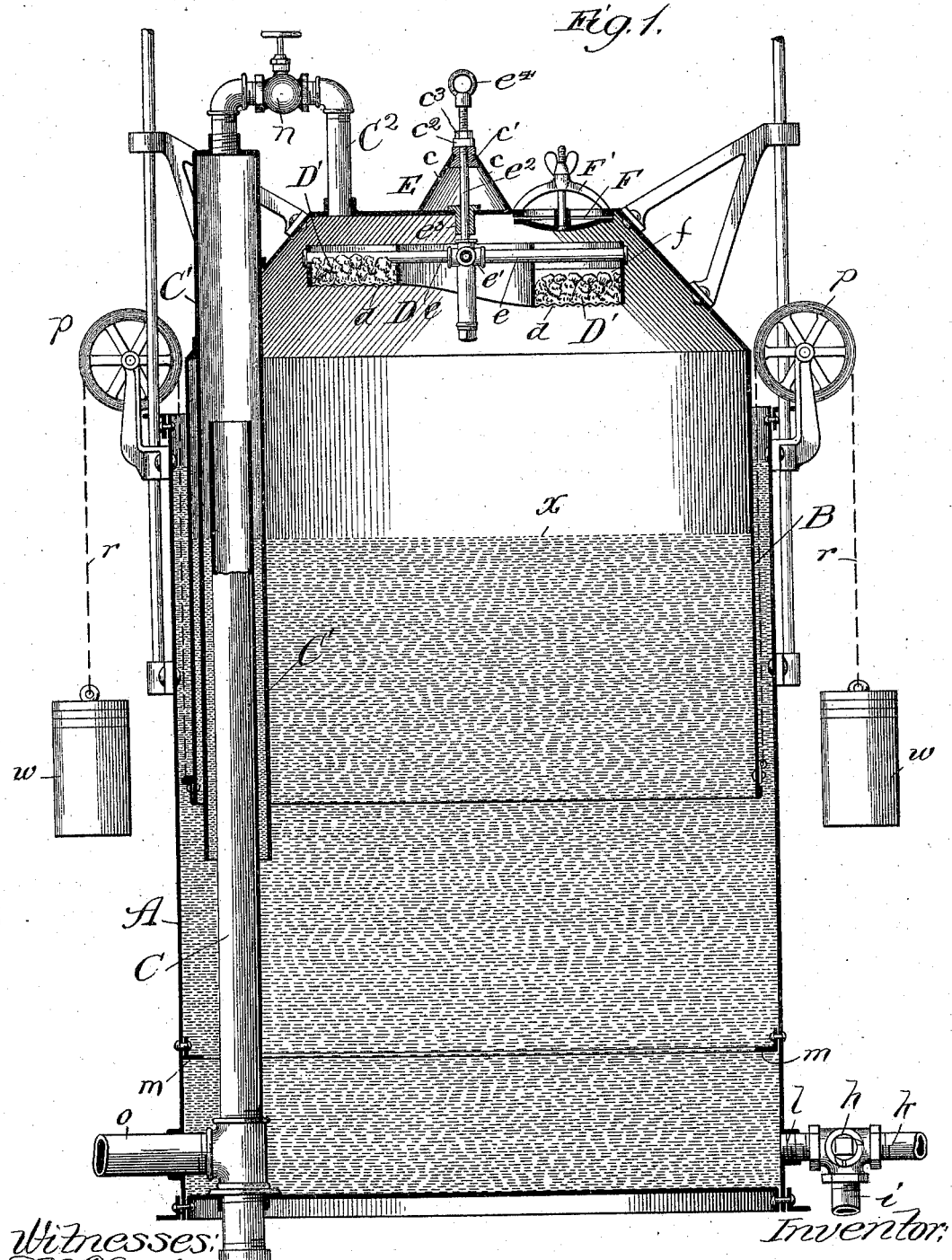

(No Model.) 2 Sheets—Sheet 1.

H. F. FULLER.
GAS GENERATOR FOR ACETYLENE.

No. 575,474. Patented Jan. 19, 1897.

Witnesses:
Chas. E. Gaylord.
Lute J. Felter.

Inventor:
Henry F. Fuller,
By Dyrenforth & Dyrenforth,
Attys.

THE NORRIS PETERS CO., PHOTO-LITHO., WASHINGTON, D. C.

(No Model.) 2 Sheets—Sheet 2.

H. F. FULLER.
GAS GENERATOR FOR ACETYLENE.

No. 575,474. Patented Jan. 19, 1897.

Witnesses:

Inventor:
Henry F. Fuller,
By Dyrenforth & Dyrenforth,
Attys.

UNITED STATES PATENT OFFICE.

HENRY F. FULLER, OF CHICAGO, ILLINOIS, ASSIGNOR TO THE WALMSLEY, FULLER & COMPANY, OF SAME PLACE.

GAS-GENERATOR FOR ACETYLENE.

SPECIFICATION forming part of Letters Patent No. 575,474, dated January 19, 1897.

Application filed November 2, 1896. Serial No. 610,850. (No model.)

*To all whom it may concern:*

Be it known that I, HENRY F. FULLER, a citizen of the United States, residing at Chicago, in the county of Cook and State of Illinois, have invented a new and useful Improvement in Gas-Generators, of which the following is a specification.

My invention relates to an improvement in the class of generators for generating gas from suitable chemically-coacting liquid and solid materials by bringing them into contact with each other; and it relates particularly to an improvement in such generators wherein the generator contains a gasometer for holding the gas under slight pressure, controlling the contact between the liquid and solid materials to render the action of the apparatus automatic in the sense of causing the generation of gas to take place proportionately to the consumption thereof and to check generation when consumption ceases.

I have designed my improvement more immediately for the manufacture of acetylene gas from calcium carbid and water, and therefore, as also for the sake of convenience, confine the description of it hereinafter contained to these particular materials for producing acetylene gas.

A serious obstacle hitherto encountered in the use of acetylene-gas generators has been the impossibility of preventing the entire charge or an unduly large portion of the supply of carbid from becoming impregnated with moisture, since the supply being in one mass presenting considerable surface area to the water, even if the latter contacts only with the base of the mass, it will soon become saturated by capillary absorption throughout and thus be rendered active in evolving acetylene gas all the time, thus, also, when the confined pressure of the generated gas forces and maintains the water out of contact with the carbid. As a consequence there is always danger of the apparatus wasting gas while in its shut-off condition, and, besides, the apparatus is not, as it should be and is intended to be, self-regulating and economical in the manner of gas generation.

My object is to provide a construction of gas-generator whereby the difficulty referred to shall be entirely overcome by preventing contact of the liquid with and its moistening effect upon a greater portion of the solid material at one time than shall be required to maintain the desired quantity of gas in the apparatus. This object I accomplish, broadly stated, by supporting the solid material on a suitable holder occupying an inclined position inside the generator. Thus the solid material will be used up progressively, for the contact, under the periodical drops in pressure, of the liquid with the solid material will be on successively higher planes on the holder and consequently on successive sections of the solid material imposed thereon, which will, accordingly, be affected by the moisture sectionwise.

My invention consists in the general construction of my improvement thus outlined, and it also consists in details of construction and combinations of parts.

Figure 2:
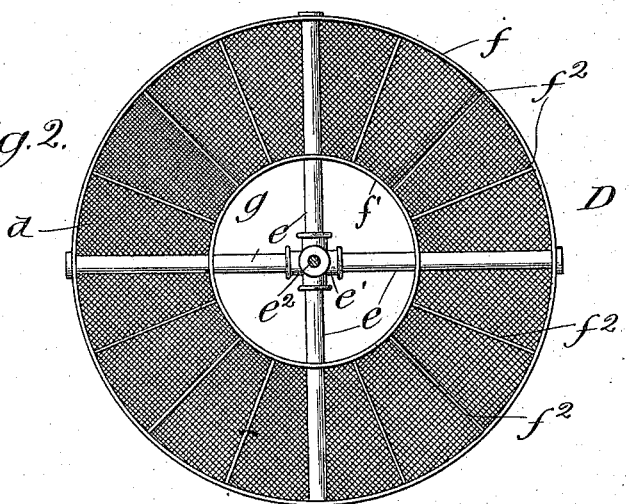
Figure 3:
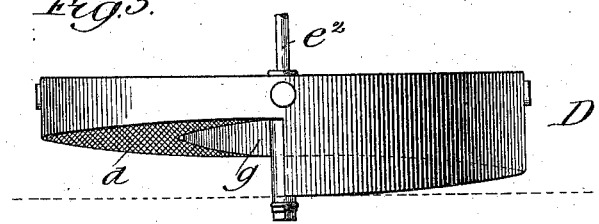

Referring to the accompanying drawings, Figure 1 is a view in sectional elevation of an acetylene-gas generator involving my improvement; Fig. 2, a plan view of the holder for calcium carbid in its preferred form; Fig. 3, a view of the same in side elevation; and Fig. 4, a view like that presented by Fig. 1, showing a broken section of the generator with a modified form of the calcium-carbid holder in place therein.

I have selected for illustrating my improvement a conventional form of acetylene-gas generator, though it is to be understood as intended by me that my improvement shall be applicable to any suitable form of such generators. As shown in Fig. 1, the generator involves the following construction:

A is the outer tank, closed at its base and open at its upper end, and B is the inner movable tank, having an open base and closed top and supported inside the tank A, as through the medium of counterweights $w$, suspended on chains $r$, connected with the inner tank and passing over pulleys $p$. A stand-pipe C extends in the generator through the base of the outer tank, near which it has the gas-outlet $o$, and below which it is equipped with the drip-cock $o'$, and with the pipe C there telescopes a pipe $C'$, depending through the top of the inner tank B, with which it communicates controllably from its outer end through a pipe connection C², containing a shut-off valve $n$. Inside the tank A is shown, near its base, a circumferential flange $m$, affording a stop for the tank B, and below the flange in a side of the outer tank is an opening $l$, through which to draw off the sediment (lime) and through which also to introduce the water for the operation of the generator, and to adapt the opening $l$ for this twofold purpose pipes $k$ and $i$, one for the discharge and the other for the water-supply, are connected with it and controlled in their communication by any suitable or well-known form of three-way-valve device $h$.

D is my improved holder for the calcium carbid, the preferred form of which is that illustrated in Figs. 1, 2, and 3, comprising a circular body or shelf, which may be formed of sheet metal, having a circular opening $g$ about its center circumferentially flanged, and between which flange $f'$ and the flange $f$, surrounding the body at its outer edge, there should extend radially and at equal intervals apart partitions $f^2$. The base of the body of the carbid-holder describes a helix and is covered with an open-work bottom $d$, which may be wire screen, for supporting the supply of calcium carbid D'.

For a purpose hereinafter described it is highly advantageous to have the carbid-holder rotatory in its position. To this end I provide it with a carrying-frame composed of four bars $e$, passed through the flanges $f$ and $f'$ and extending at right angles to each other to meet at a common center in sockets of a coupling $e'$ at the center of the opening $g$ and rotatable on the lower end of a rod $e^2$, extending upward from it through a bushing $e^3$ in the top of the tank B, upon which there is fastened a support E for the rod, from which the holder D is thus suspended. As shown, the support E is formed with upwardly-converging legs $c$, meeting at a socket $c'$, through which the threaded end of the rod $e^2$ passes, and above which the rod carries a collar $c^2$, surmounted by a nut $c^3$, for holding the collar against its seat on the socket-piece $c'$. The outer end of the rod $e^2$ is shown to be provided with a ring $e^4$, for convenience in withdrawing the bell from the lower tank.

F is the manhole in the top of the tank B, equipped with a suitable cover.

It is always a matter of great difficulty to so thoroughly pack any opening in a gas-holder as to prevent leakage, and the larger the opening the greater the difficulty in maintaining tight closure thereof. By rendering my improved carbid-holder rotatory on a central axis I reduce this difficulty to the minimum, as follows:

The manhole through which the charge of calcium carbid is fed to the holder D is provided directly over the circuitous path through which passes the circumferential series of compartments formed with the partitions $f^2$ of the holder. Accordingly by rotating the holder D to bring any section thereof or any one or more of its compartments below the manhole, the rotation being effected by hand through said manhole, a portion of the charge of calcium carbid may be introduced through the manhole to supply that particular section, when another and then another section may be brought in the same way into position to be filled until the holder shall have been completely charged. Thus, moreover, the manhole may be small compared with what it would have to be to enable access to be had through it to all parts of the holder if the latter were stationary, and the tendency to leakage is accordingly reduced.

Figure 4:
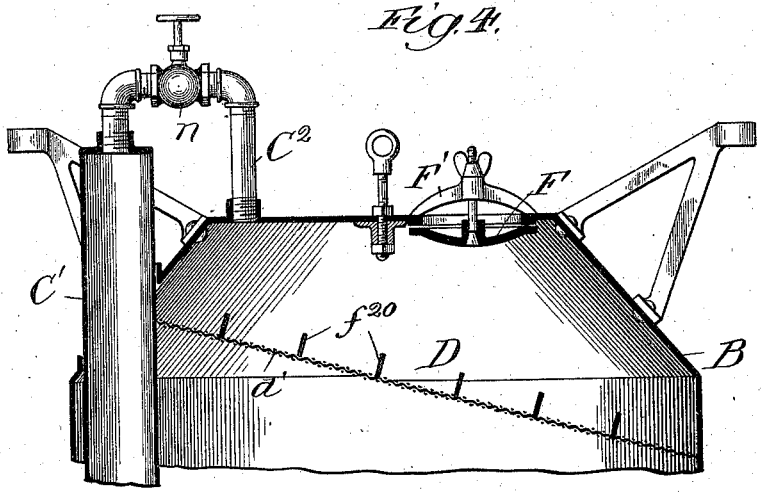

The simplest form of my improved carbid-holder is that presented in Fig. 4, wherein the shelf is shown to be composed of a mere inclined screen $d'$, surmounted by partition-strips $f^2$ to afford compartments for holding the calcium carbid.

In Fig. 1 the water-line is indicated at $x$.

The operation of the apparatus is as follows: When there is no gas in the generator or the quantity therein becomes sufficiently reduced, the tank B will drop till the lowermost portion of the inclined holder D and of the calcium carbid thereon comes into contact with the water. Immediate evolution of acetylene gas ensues, the gas passing out through the pipe C² into the pipe C' and thence, owing to the seal afforded by the water, into the pipe C, escaping at the outlet $o$ to the point or points of storage or consumption. When the quantity of gas in the tank B increases sufficiently, by abutment against the water-surface it raises the inner tank and thus removes the holder D and its contents out of contact with the water and stops the further generation of gas till the quantity is reduced by consumption far enough to permit the consequent descent of the tank B to bring the carbid again into contact with the water.

Owing to the form, or rather the relative disposition, of the carbid-holder, it will be quite obvious that only a small portion of the calcium carbid need be brought into contact at any one time with the water. Thus when that at the lower part of the holder has been consumed the descent of the inner tank will be that much lower to bring a portion of the as yet untouched or unconsumed supply of carbid into contact with the water, and so on till the entire supply of carbid has been consumed. The purpose of the partitions $f^2$ is to keep the supply of calcium carbid divided, as well as to tend to prevent the creeping of moisture from one portion to another. Of course where only a portion of the material in a compartment of the holder D is in actual contact with the water the remainder or a portion of the remainder may become affected by the moisture through capillary attraction, but not sufficiently to materially interfere with the desired automatic generating and regulating action of the apparatus.

Two forms or arrangements of my improved holder for the calcium carbid are herein shown and described. The principle thereof, however—namely, of subjecting successive planes of the solid material progressively to the action of the liquid—may be applied in various other desirable forms, all of which are within the spirit of my invention.

What I claim as new, and desire to secure by Letters Patent, is—

1. In a gas-generator of the character described, a holder for the solid material, comprising a shelf having partitions at intervals on its upper side forming compartments, said shelf inclining downward within the generator with relation to the liquid-level therein, subtantially as and for the purpose set forth.

2. In a gas-generator of the character described, a holder for the solid material, comprising a shelf rotatably supported in the generator with relation to the manhole thereof and inclining downward with relation to the liquid-level in the generator, substantially as and for the purpose set forth.

3. In a gas-generator of the character described, a holder for the solid material, comprising a shelf having a helically-inclined open-work base, substantially as and for the purpose set forth.

4. In a gas-generator of the character described, a holder for the solid material, comprising a shelf having a helically-inclined open-work base and partitions provided at intervals to form compartments, substantially as and for the purpose set forth.

5. In a gas-generator of the character described, a holder for the solid material, comprising a shelf having a helically-inclined open-work base and rotatably supported in the generator with relation to the manhole thereof, substantially as and for the purpose set forth.

6. In a gas-generator of the character described, a holder D for the solid material, comprising an open-work base $d$ extending helically about a center $g$, the outer and inner circumferential flanges $f$ and $f'$ and the radial partitions $f^2$, a frame connected with said holder, a stem $e^2$ extending from the center of the frame through the top of the generator, and a bearing E on the top of the generator in which said stem is supported, substantially as and for the purpose set forth.

HENRY F. FULLER.

In presence of—
J. H. LEE,
R. T. SPENCER.